(12) United States Patent
Kawamura et al.

(10) Patent No.: US 10,644,418 B2
(45) Date of Patent: May 5, 2020

(54) DRAIN STRUCTURE, TERMINAL BLOCK, AND ON-VEHICLE DEVICE

(71) Applicant: Yazaki Corporation, Tokyo (JP)

(72) Inventors: Yukihiro Kawamura, Makinohara (JP); Naoki Isaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/364,940

(22) Filed: Mar. 26, 2019

(65) Prior Publication Data

US 2019/0305446 A1  Oct. 3, 2019

(30) Foreign Application Priority Data

Mar. 30, 2018  (JP) .................................. 2018-066897

(51) Int. Cl.
  *H01R 9/24* (2006.01)
  *B60R 16/02* (2006.01)
  (Continued)

(52) U.S. Cl.
  CPC ........... *H01R 9/24* (2013.01); *B60R 16/0207* (2013.01); *B60R 16/0239* (2013.01);
  (Continued)

(58) Field of Classification Search
  CPC ................ H01R 13/207; H01R 13/405; H01R 13/4223; H01R 13/46; H01R 13/516; H01R 13/5202; H01R 13/5205; H01R 13/521; H01R 13/5213; H01R 13/5219; H01R 13/6215; H01R 2201/26; H01R 25/162; H02G 3/00; H02G 3/0418; H02G 3/0437;
  (Continued)

(56) References Cited

U.S. PATENT DOCUMENTS

| 4,654,470 | A  | * | 3/1987  | Feldman ............... | H01R 4/2483 |
|           |    |   |         |                        | 174/50      |
| 6,787,698 | B2 | * | 9/2004  | Higuchi ................. | H02G 3/088  |
|           |    |   |         |                        | 174/50      |
| 7,179,990 | B2 | * | 2/2007  | Kanazawa ............. | H02G 3/088  |
|           |    |   |         |                        | 174/50      |
| 7,572,150 | B2 | * | 8/2009  | Matsuoka ............. | H01R 13/207 |
|           |    |   |         |                        | 439/626     |
| 7,639,476 | B2 | * | 12/2009 | Sasaki ................. | H01R 13/5227|
|           |    |   |         |                        | 174/50      |

(Continued)

FOREIGN PATENT DOCUMENTS

| EP | 2525443 A1   | 11/2012 |
| JP | 2004-23875 A | 1/2004  |

(Continued)

*Primary Examiner* — Edwin A. Leon
*Assistant Examiner* — Matthew T Dzierzynski
(74) *Attorney, Agent, or Firm* — Sughrue Mion, PLLC

(57) ABSTRACT

An on-vehicle device has a device box accommodating a device body; a terminal block attached to an upper wall of the device box; and a wire harness electrically connected to the device body through this terminal block. The terminal block adopts a drain structure, and this drain structure is provided with: the upper wall of the device box; a housing body attached to the side of an outer surface of the upper wall; a drain outlet passing through a bottom wall of the housing body; and a drain ditch formation portion for forming a drain ditch from this drain outlet to the outside of the housing body. In the drain ditch formation portion, an outer surface of the bottom wall is formed so as to be separated from the outer surface of the upper wall by a dimension of a gap where a capillary phenomenon occurs.

8 Claims, 10 Drawing Sheets

(51) Int. Cl.
*B60R 16/023* (2006.01)
*H01R 13/516* (2006.01)
*H01R 13/52* (2006.01)
*H01R 13/74* (2006.01)
*H01R 25/16* (2006.01)

(52) U.S. Cl.
CPC ......... *H01R 13/516* (2013.01); *H01R 13/521* (2013.01); *H01R 13/5202* (2013.01); *H01R 13/5227* (2013.01); *H01R 13/748* (2013.01); *H01R 25/162* (2013.01); *H01R 13/74* (2013.01)

(58) Field of Classification Search
CPC .......... H02G 3/08; H02G 3/081; H02G 3/088; H02G 3/10
See application file for complete search history.

(56) References Cited

U.S. PATENT DOCUMENTS

| | | | | |
|---|---|---|---|---|
| 9,017,099 | B2* | 4/2015 | Ikeda | H01R 25/162 |
| | | | | 439/559 |
| 9,331,462 | B2* | 5/2016 | Kaneko | H02G 3/081 |
| 9,438,018 | B2* | 9/2016 | Kaneko | B60R 16/0238 |
| 9,981,618 | B2* | 5/2018 | Kawaguchi | H01R 9/226 |
| 10,122,159 | B2* | 11/2018 | Okada | B60R 16/02 |
| 10,283,917 | B1* | 5/2019 | Darr | B60R 16/0238 |
| 2013/0217262 | A1 | 8/2013 | Ikeda et al. | |

FOREIGN PATENT DOCUMENTS

| | | |
|---|---|---|
| JP | 2012-69261 A | 4/2012 |
| JP | 2016-25038 A | 2/2016 |

* cited by examiner

DRAIN STRUCTURE, TERMINAL BLOCK, AND ON-VEHICLE DEVICE

CROSS-REFERENCE TO RELATED APPLICATIONS

This application is based on and claims priority under 35 USC 119 from Japanese Patent Application No. 2018-066897 filed on Mar. 30, 2018, the contents of which are incorporated herein by reference.

TECHNICAL FIELD

The present invention relates to a drain structure between a wall and a housing body. Moreover, the present invention relates to a terminal block adopting this drain structure and an on-vehicle device to which a wire harness is connected through the terminal block.

BACKGROUND ART

As a terminal block attached to the wall of a device box and used for electrical connection between the inside and outside of this wall, a terminal block disclosed in Patent Document 1 described below is known. Briefly describing the structure with reference to FIGS. 9 and 10, the terminal block 1 is provided with a housing 2, a bus bar 3, a stud bolt 4, O-rings 5 and 6, and a holder 7.

The housing 2 is attached to the wall of a non-illustrated device box with non-illustrated volts. The housing 2 like this has a wall insertion portion 8 inserted into an insertion hole formed so as to pass through the above-mentioned wall and a housing body 9 continuous with this wall insertion portion 8. The bus bar 3 has a bus bar body 10, an outside terminal portion 11 continuous with one end of this bus bar body 10, and an inside terminal portion 12 continuous with the other end of the bus bar body 10. The bus bar 3 is formed substantially in an L shape such that the outside terminal portion 11 is bent 90 degrees with respect to the bus bar body 10. The bus bar 3 is assembled in such a way that the bus bar body 10 is inserted into the housing 2 and the holder 7. The bus bar 3 like this is disposed so that the inside terminal portion 12 is exposed inside the above-mentioned wall. Moreover, the bus bar 3 is disposed so that the outside terminal portion 11 is exposed outside the above-mentioned wall. In the state of the terminal block 1, the stud bolt 4 is assembled to the outside terminal portion 11.

The O-ring 5 is provided for waterproofing between the housing 2 and the bus bar 3. Moreover, the O-ring 6 is provided for waterproofing between the above-mentioned wall (the through hole) and the housing 2. The holder 7 is provided to prevent the O-ring 5 assembled to the housing body 9 from dropping off. Reference numerals 13 and 13 at the holder 7 represent lock portions. Moreover, reference numerals 14 and 14 at the housing body 9 also represent lock portions. In the terminal block 1, the lock portions 14 and the lock portions 13 lock each other to thereby fix the holder 7, and this fixing of the holder 7 prevents the O-ring 5 from dropping off.

In FIGS. 9 and 10, the locking between the lock portions 14 and the lock portions 13 is made in the neighborhood of the parts of the housing 2 fixed to the above-mentioned wall (bolt fixing holes 15).

In FIGS. 9 and 10, regarding the bus bar 3, this bus bar 3 is locked to a non-illustrated housing side lock portion formed in the wall insertion portion 8. Reference numeral 16 represents a bus bar side lock portion of the bus bar body 10. Reference numerals 17 and 17 at the bus bar 3 represent a pair of engagement pieces.

PRIOR ART DOCUMENT

Patent Document

Patent Document 1: JP-A-2012-69261

SUMMARY OF INVENTION

In the above-described prior art, if the terminal block 1 is attached with the stud bolt 4 facing upward, for example, when high-pressure washing or the like is performed, there is a possibility that moisture accumulates in a space SP surrounded by a frame portion of the housing body 9, and if this is repeated over a long period, corrosion or the like of the bus bar 3 accommodated in the housing body 9 is apprehended. The inventor of the present application considers it insufficient merely to form a drain outlet.

The present invention is made in view of the above-mentioned circumstances, and an object thereof is to provide a drain structure capable of facilitating drainage to the outside and making entrance of moisture from the outside difficult. Another object is to provide a terminal block adopting this drainage structure and an on-vehicle device to which a wire harness is connected through the terminal block.

Means for Solving the Problem

A drain structure of the present invention made to solve the above-mentioned problem is provided with: a wall; a housing body attached to an outer surface side of the wall; a drain outlet passing through a bottom wall of the housing body; and a drain ditch formation portion for forming a drain ditch from the drain outlet to an attachment outer portion of the housing body, and in the drain ditch formation portion, an outer surface of the bottom wall is formed so as to be separated from the outer surface of the wall by a dimension of a gap where a capillary phenomenon occurs.

According to the present invention having the above feature, moisture is drained to the outside from the drain outlet of the housing body through the drain ditch by the drain ditch formation portion. Moreover, entrance of moisture from the attachment outer portion of the housing body is difficult since the gap of the drain ditch formation portion is small, so that even if moisture enters from the gap, it is difficult for the moisture to enter the inside of the housing body from the drain outlet and accumulate inside the housing body. Consequently, according to the present invention, a drain structure can be provided that is capable of facilitating drainage to the outside and making entrance of moisture from the outside difficult.

Further, in the present invention, the drain structure is further provided with an O-ring sandwiched between the wall and the bottom wall, and the drain ditch formation portion is formed by causing the gap by elastic deformation in a deformation direction of the O-ring.

According to the present invention, by using the elastic deformation of the O-ring for sealing the wall and the housing body between them, the outer surface of the bottom wall can be easily separated from the outer surface of the wall by the dimension of the gap where a capillary phenomenon occurs. Consequently, drainage to the outside can be facilitated and entrance of moisture from the outside can be made difficult without the adoption of a complicated structure.

Moreover, in the present invention, the drain ditch formation portion is formed in a position outside the O-ring and over an entire periphery of an opening edge of the drain outlet.

According to the present invention, even if moisture from the attachment outer portion of the housing body enters from the small gap of the drain ditch formation portion, since the gap is present over the entire periphery of this opening edge of the drain outlet, a state can be brought about where moisture easily passes through. That is, entrance of moisture into the housing body can be made difficult.

Further, in the present invention, the drain structure is further provided with: a metallic collar provided on a body fixing portion continuous with the housing body; and a bolt inserted in the collar, and the drain ditch formation portion is formed by causing the collar to protrude toward the outer surface of the bottom wall to cause the gap.

According to the present invention, by using the metallic collar provided on the body fixing portion for fixing the housing body, the outer surface of the bottom wall can be easily separated from the outer surface of the wall by the dimension of the gap where a capillary phenomenon occurs. Consequently, drainage to the outside can be facilitated and entrance of moisture from the outside can be made difficult without the adoption of a complicated structure.

In the present invention, the drain ditch formation portion is formed in a neighborhood of a base end position of the body fixing portion and over an entire periphery of an opening edge of the drain outlet.

According to the present invention, even if moisture from the attachment outer portion of the housing body enters from the small gap of the drain ditch formation portion, since the gap is present over the entire periphery of this opening edge of the drain outlet, a state can be brought about where moisture easily passes through. That is, entrance of moisture into the housing body can be made difficult.

Furthermore, in the present invention, the wall is formed as an upper wall of a device box accommodating a device body.

According to the present invention, the attachment state is such that the housing body is placed on the upper wall of the device box. Ordinarily, even if a drain outlet is formed on the bottom wall of the housing body, it is closed at the upper wall; however, since the drain structure of the present invention adopts the drain ditch formation portion, drainage to the outside can be facilitated even in the above-mentioned attachment state.

Moreover, a terminal block of the present invention made to solve the above-mentioned problem is provided with: a housing body attached to an outer surface side of a wall; a drain outlet passing through a bottom wall of the housing body; and a drain ditch formation portion for forming a drain ditch from the drain outlet to an attachment outer portion of the housing body, and in the drain ditch formation portion, an outer surface of the bottom wall is formed so as to be separated from the outer surface of the wall by a dimension of a gap where a capillary phenomenon occurs.

According to the present invention having the above structure, since the drain structure is adopted, a terminal block can be provided that is capable of facilitating drainage to the outside and making entrance of moisture from the outside difficult.

Further, in the present invention, the terminal block is further provided with: a bus bar for electrically connecting an inside and an outside of the wall; and a holder for accommodating the bus bar in the housing body, and a space extension portion for extending a spatial distance from the bus bar to the drain outlet is formed on the holder.

According to the present invention having the above feature, since the holder where the space extension portion is formed is adopted, the spatial distance from the bus bar assembled to this holder to the drain outlet of the housing body can be made long. Consequently, even when the wall to which the terminal block is attached is made of a metal, leak during drainage can be prevented.

Moreover, in the present invention, the wall is formed as an upper wall of a device box accommodating a device body.

According to the present invention having the above feature, the attachment state is such that the terminal block is placed on the upper wall of the device box through the housing body. Ordinarily, even if a drain outlet is formed on the bottom wall of the housing body, it is closed at the upper wall; however, since the terminal block of the present invention adopts the drain structure having the drain ditch formation portion, drainage to the outside can be facilitated even in the above-mentioned attachment state.

Moreover, an on-vehicle device of the present invention made to solve the above-mentioned problem is mounted on a vehicle in a state of being provided with: a device body; a device box accommodating the device body; the terminal block according to the above features attached to an upper wall of the device box; and a wire harness electrically connected to the device body through the terminal block.

According to the present invention having the above features, since the terminal bock adopting the above-described drain structure is included in the structure, drainage to the outside can be facilitated and entrance of moisture from the outside can be made difficult.

Advantage of Invention

According to the drain structure of the present invention, an advantage is produced in that drainage to the outside can be facilitated and entrance of moisture from the outside can be made difficult. Moreover, according to the terminal block and the on-vehicle device of the present invention, since the above-described drain outlet is adopted, an advantage is produced in that more excellent terminal block and on-vehicle device can be provided.

BRIEF DESCRIPTION OF DRAWINGS

FIG. 1A is a schematic view showing an assembly position of the terminal block, and FIG. 1B is a perspective view of the terminal block.

DESCRIPTION OF EMBODIMENTS

An on-vehicle device is mounted on a vehicle in a state of being provided with a device box accommodating a device body, a terminal block attached to the wall of the device box and a wire harness electrically connected to the device body through the terminal block. The terminal block adopts a drain structure, and this drain structure is provided with the wall of the device box, a housing body attached to the outer surface side of this wall, a drain outlet passing through the bottom wall of the housing body, and a drain ditch formation portion for forming a drain ditch from this drain outlet to an attachment outer portion of the housing body. The drain ditch formation portion is formed so that the outer surface of the bottom wall is away from the outer surface of the wall by the dimension of a gap where a capillary phenomenon occurs.

Example

Figure 1A:
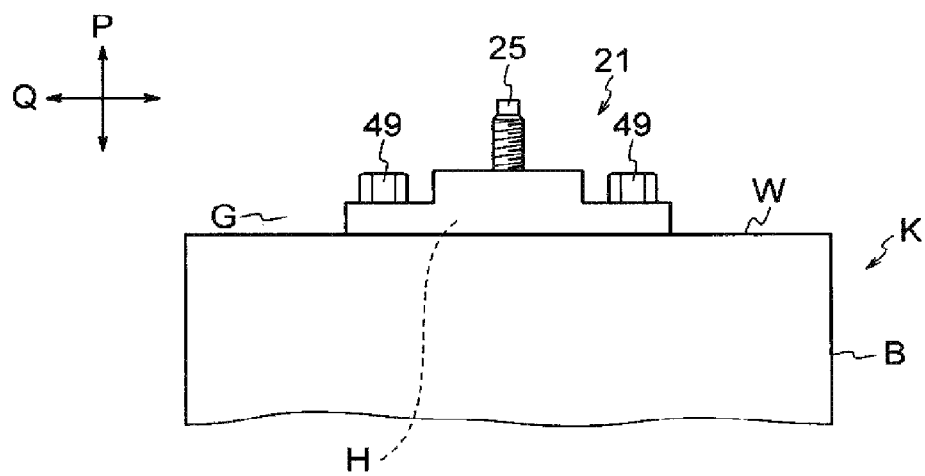
FIGS. 1A and 1B are views showing an embodiment of a terminal block adopting a drain structure of the present invention and an on-vehicle device.
Figure 1B:
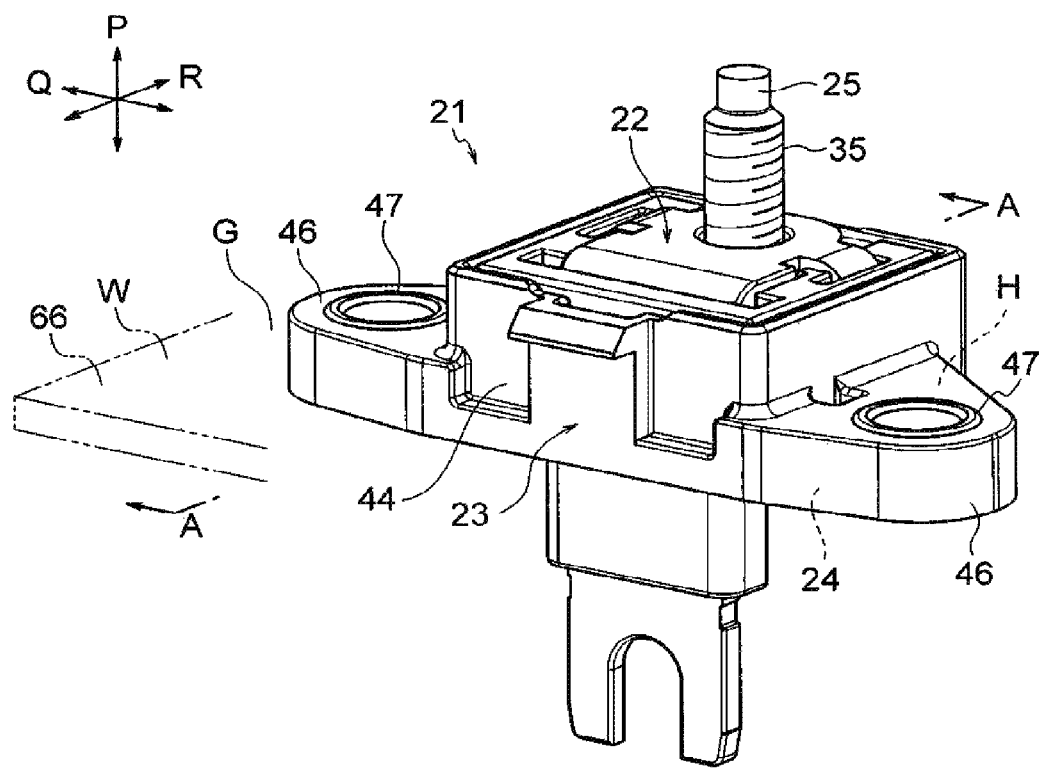
Figure 2:
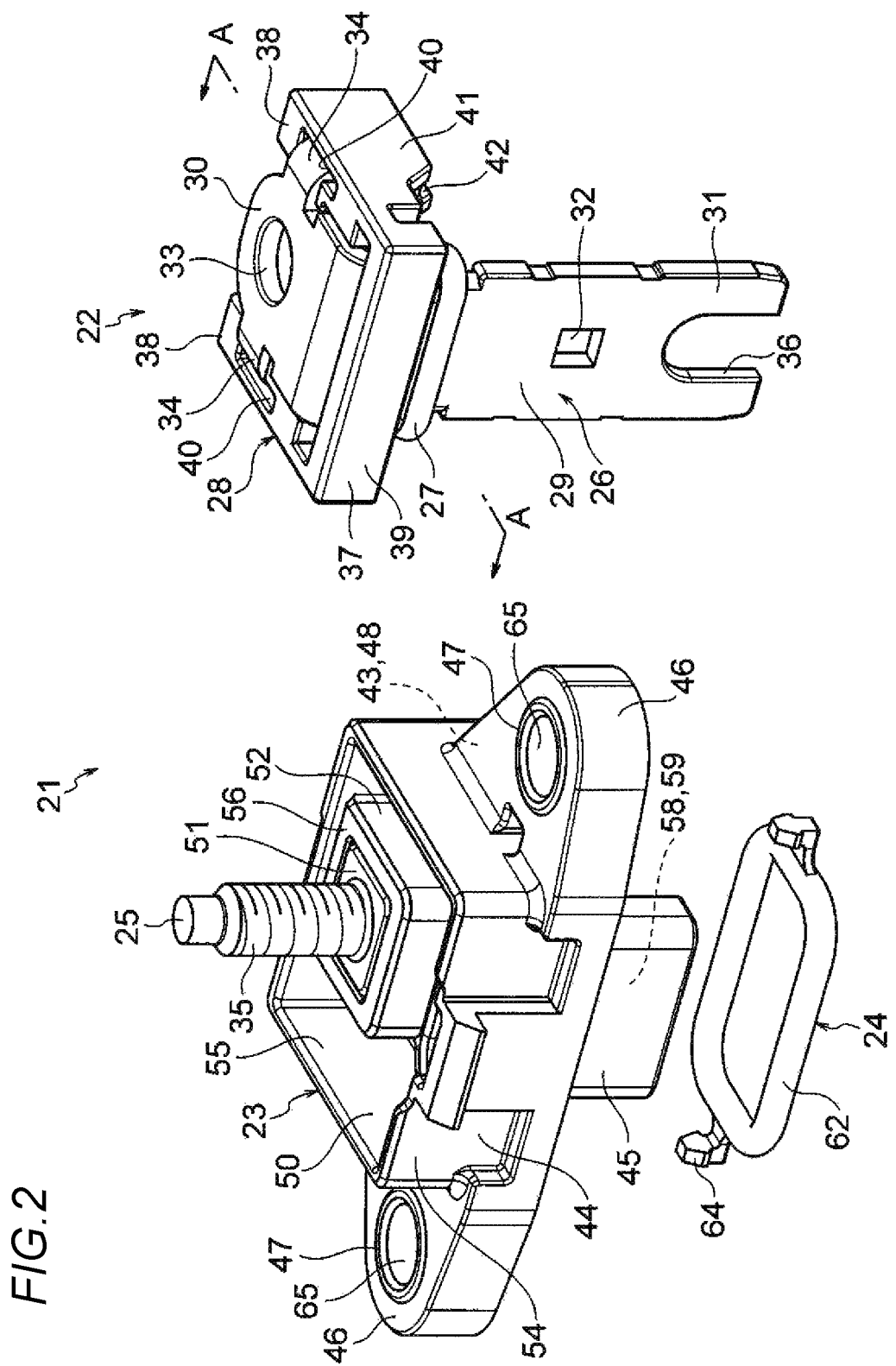
FIG. 2 is an exploded perspective view of the terminal block.
Figure 3:
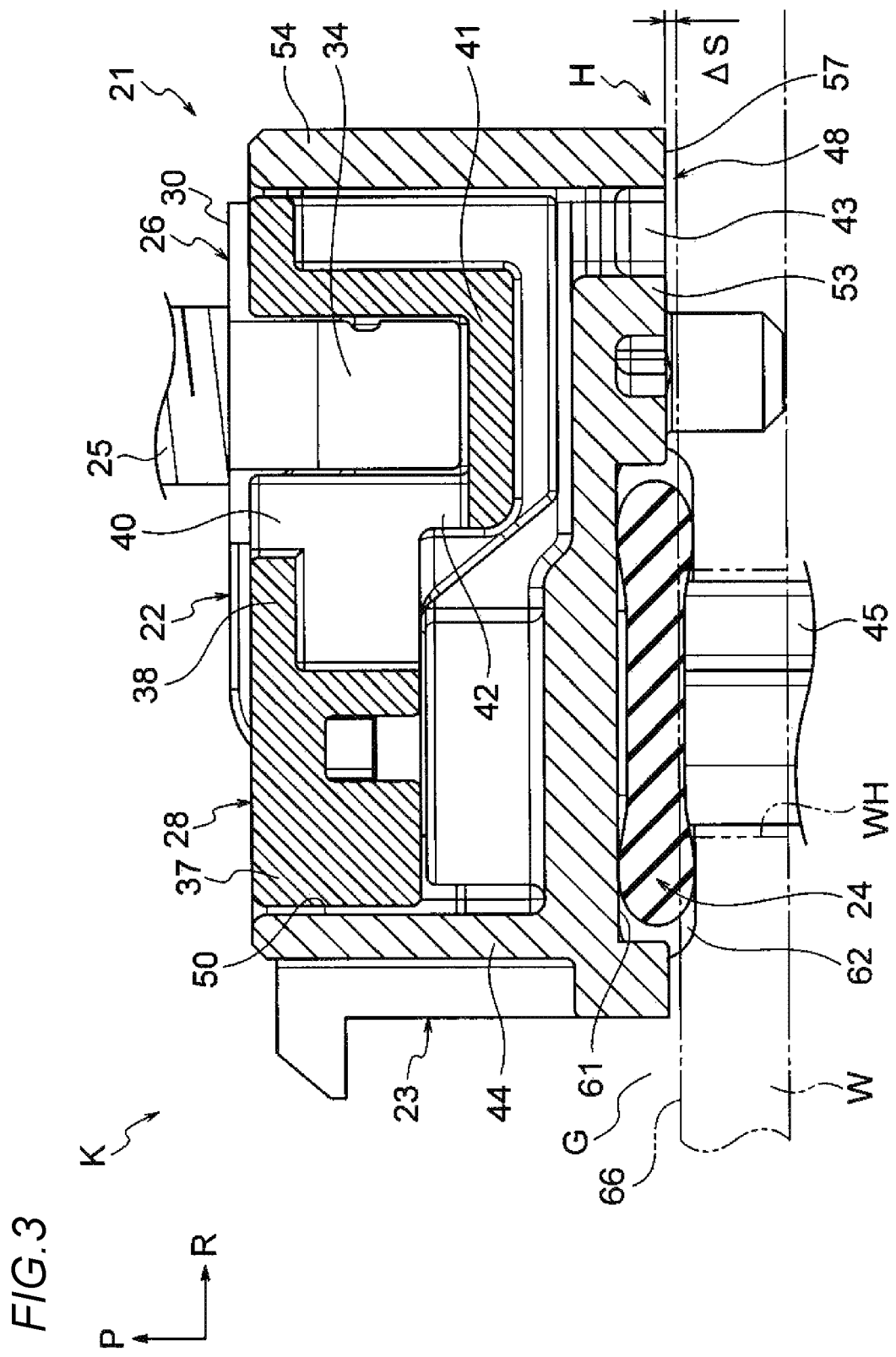
FIG. 3 is a cross-sectional view taken along the line A-A of FIG. 1B.
Figure 4:
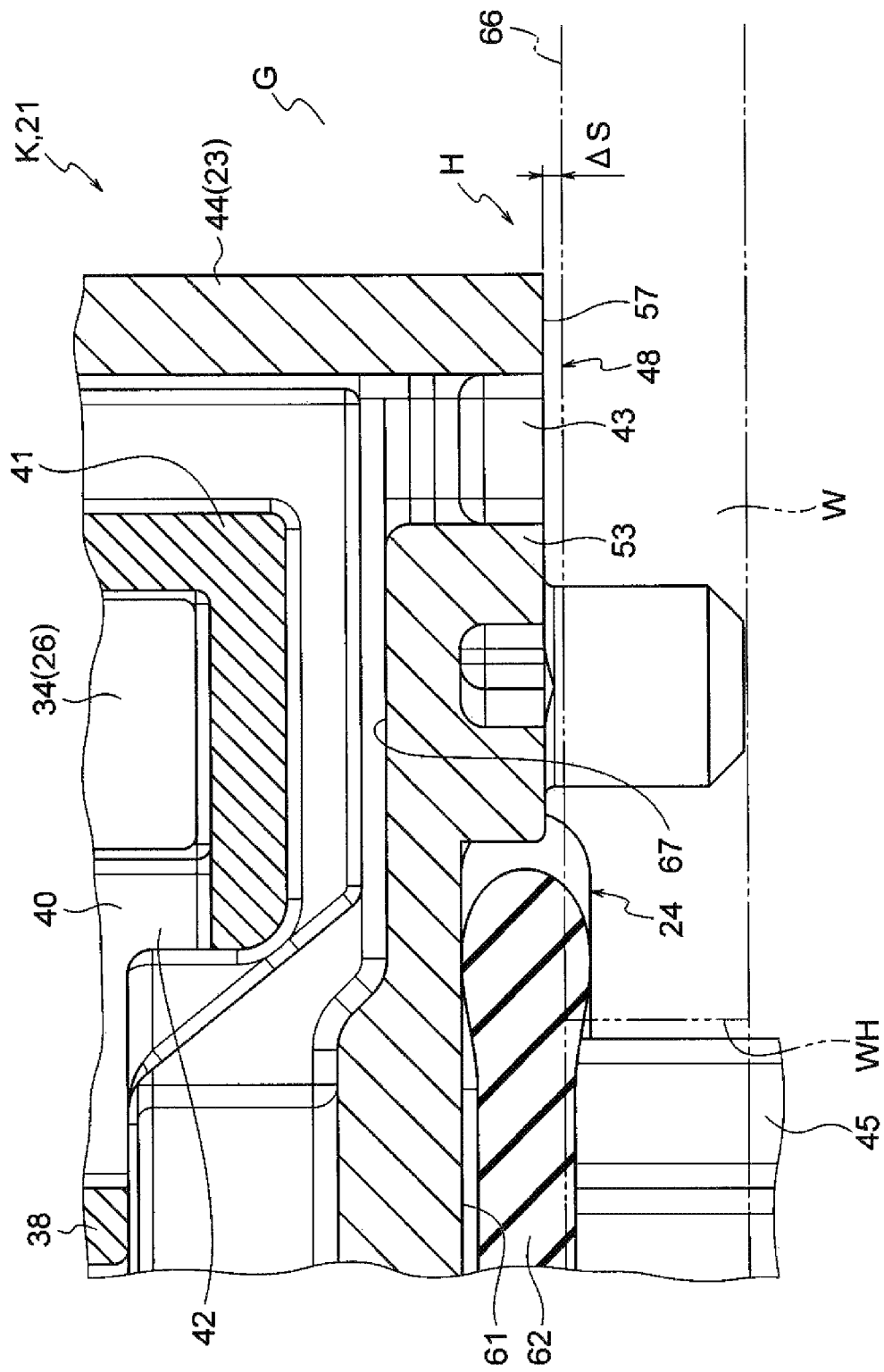
FIG. 4 is an enlarged view of a relevant part of FIG. 3.
Figure 5:
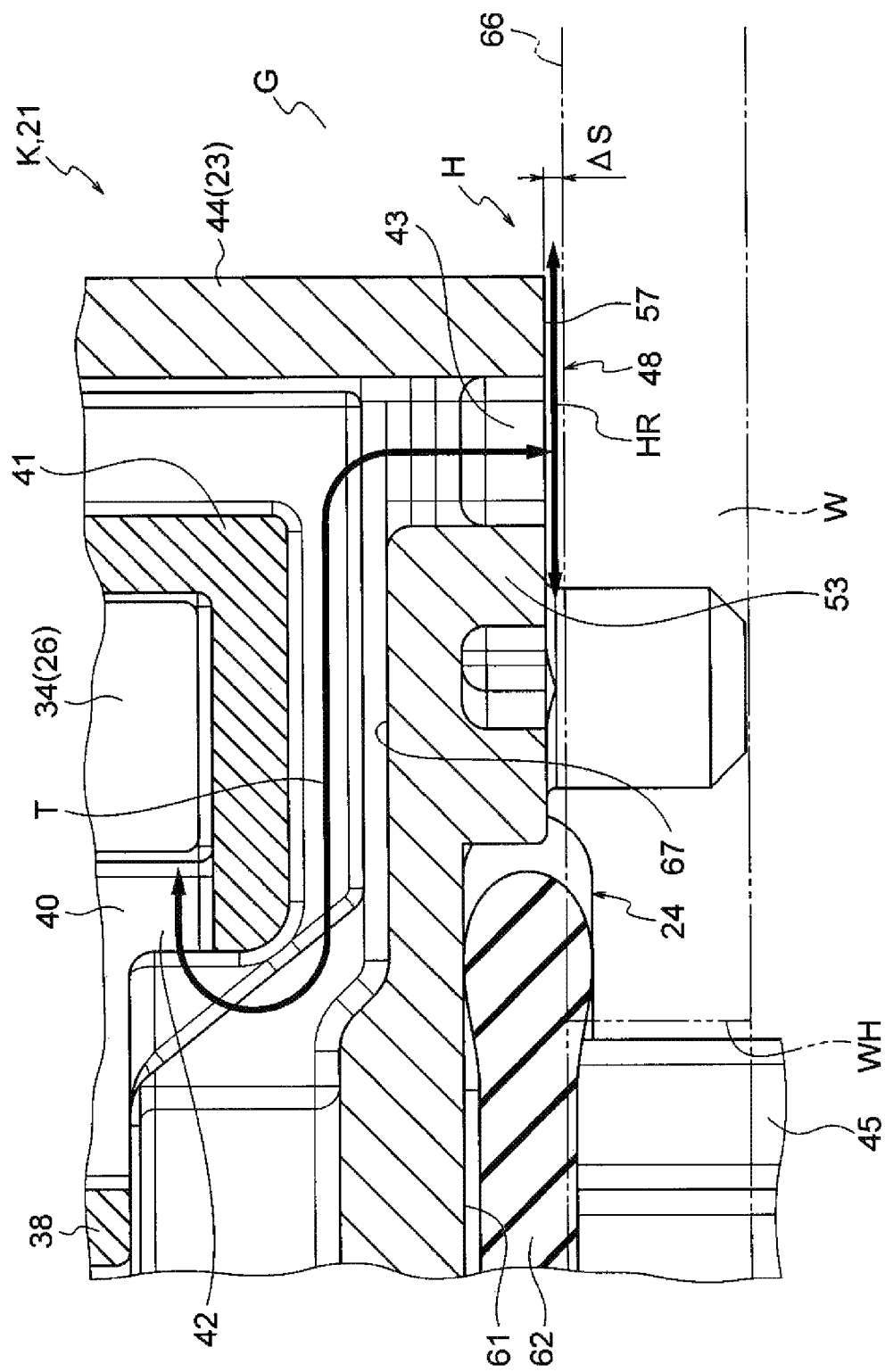
FIG. 5 is an explanatory view of a path and a spatial distance regarding drainage.
Figure 6:
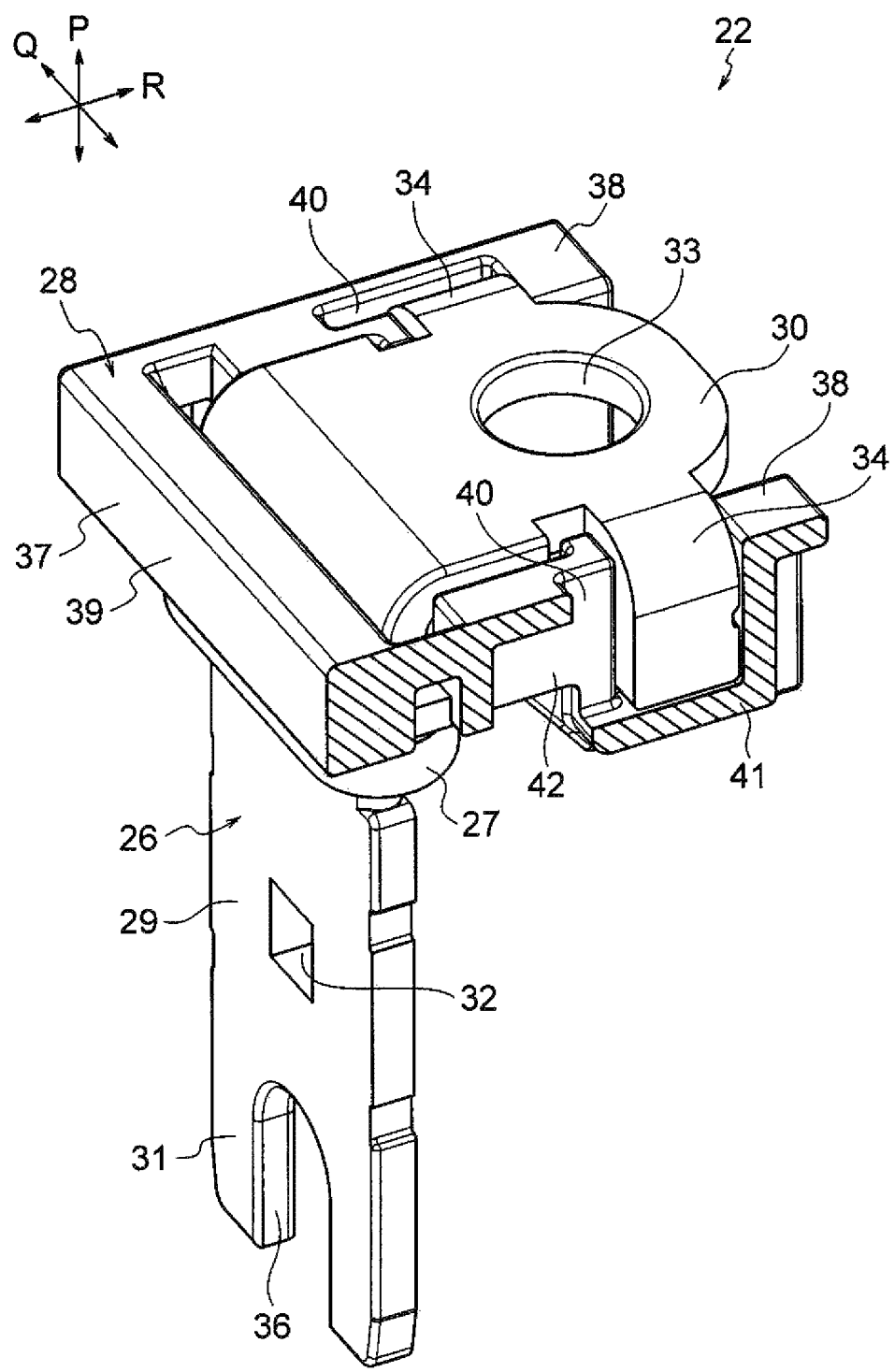
FIG. 6 is a cross-sectional view taken along the line A-A of FIG. 2.
Figure 7A:
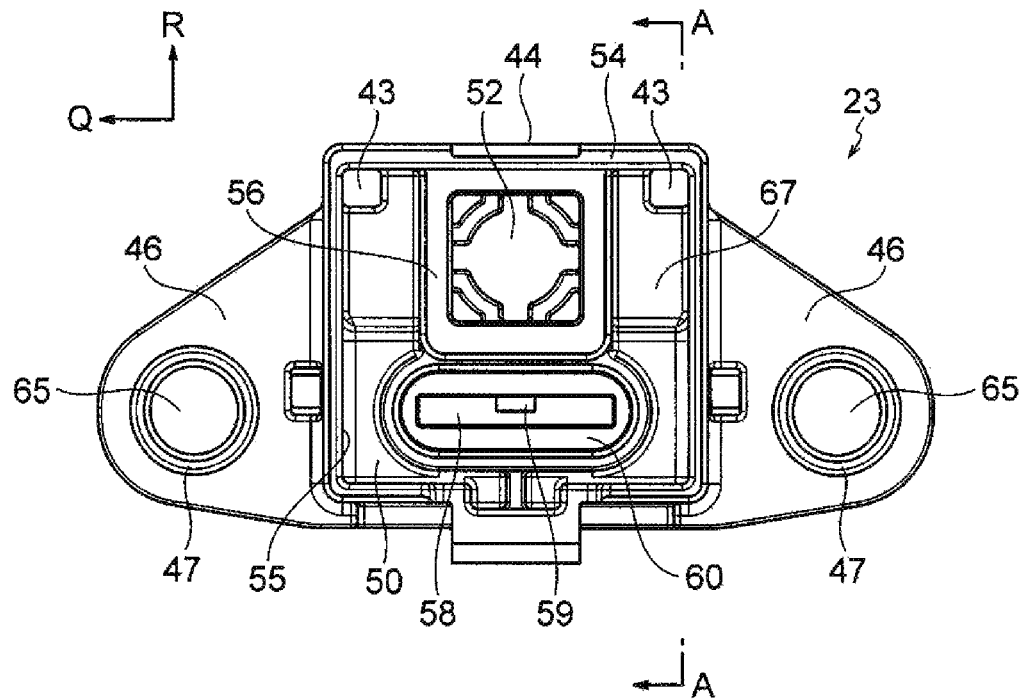
FIG. 7A is a plan view of a housing.
Figure 7B:
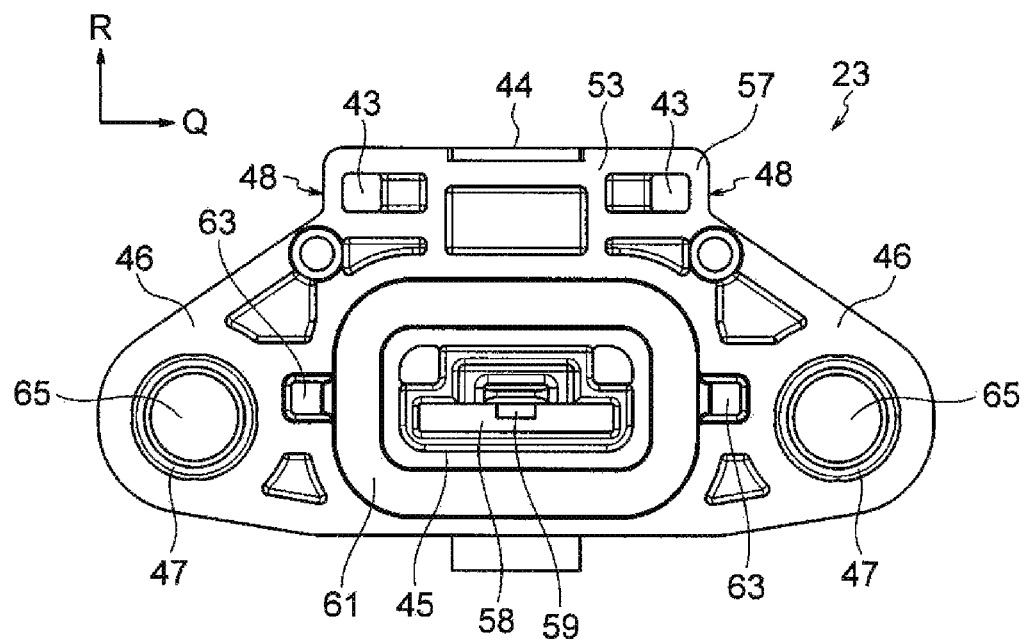
FIG. 7B is a bottom view of the housing.
Figure 8:
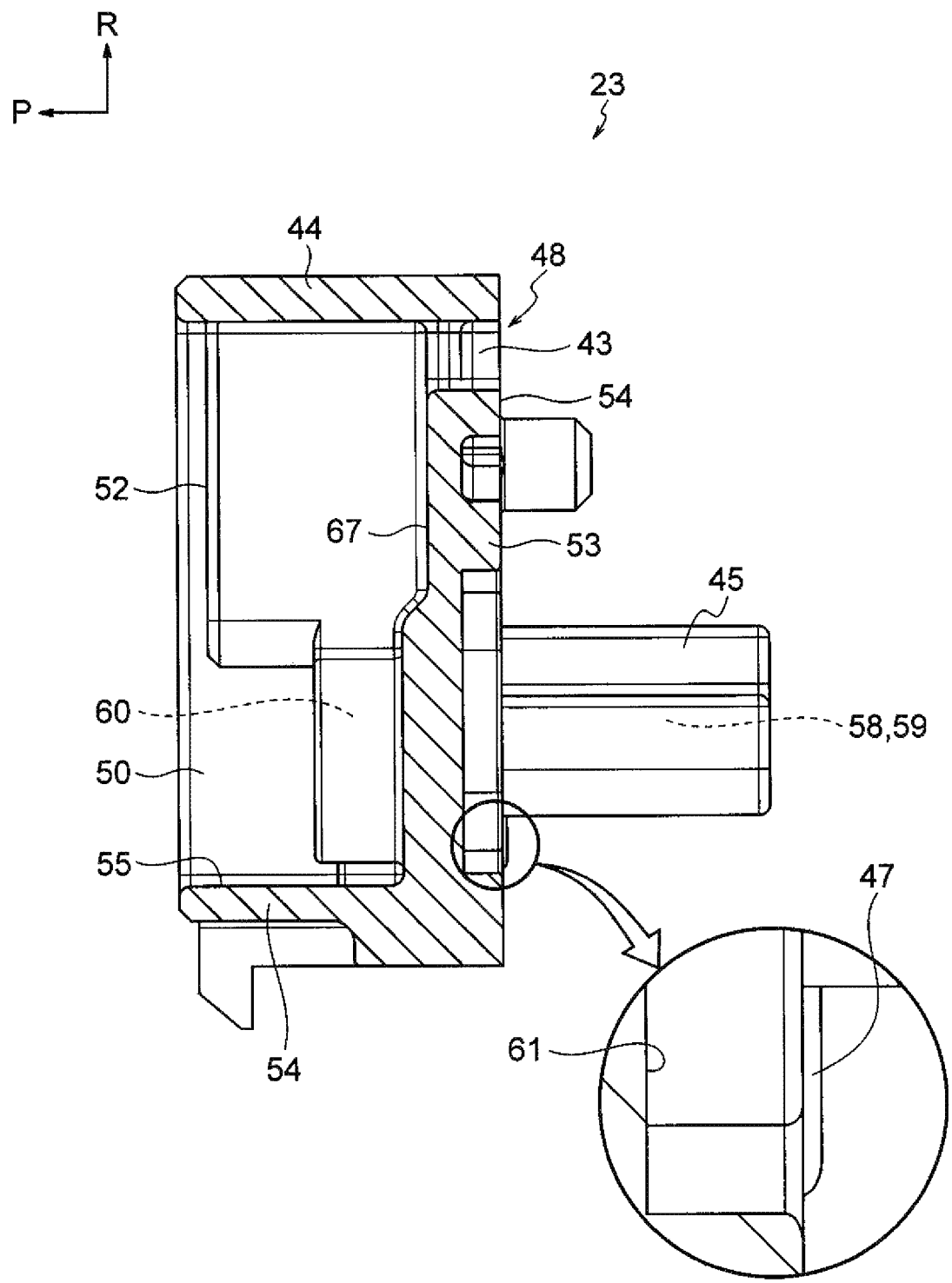
FIG. 8 is a cross-sectional view taken along the line A-A of FIG. 7A (an enlarged view in the circle).
Figure 9:
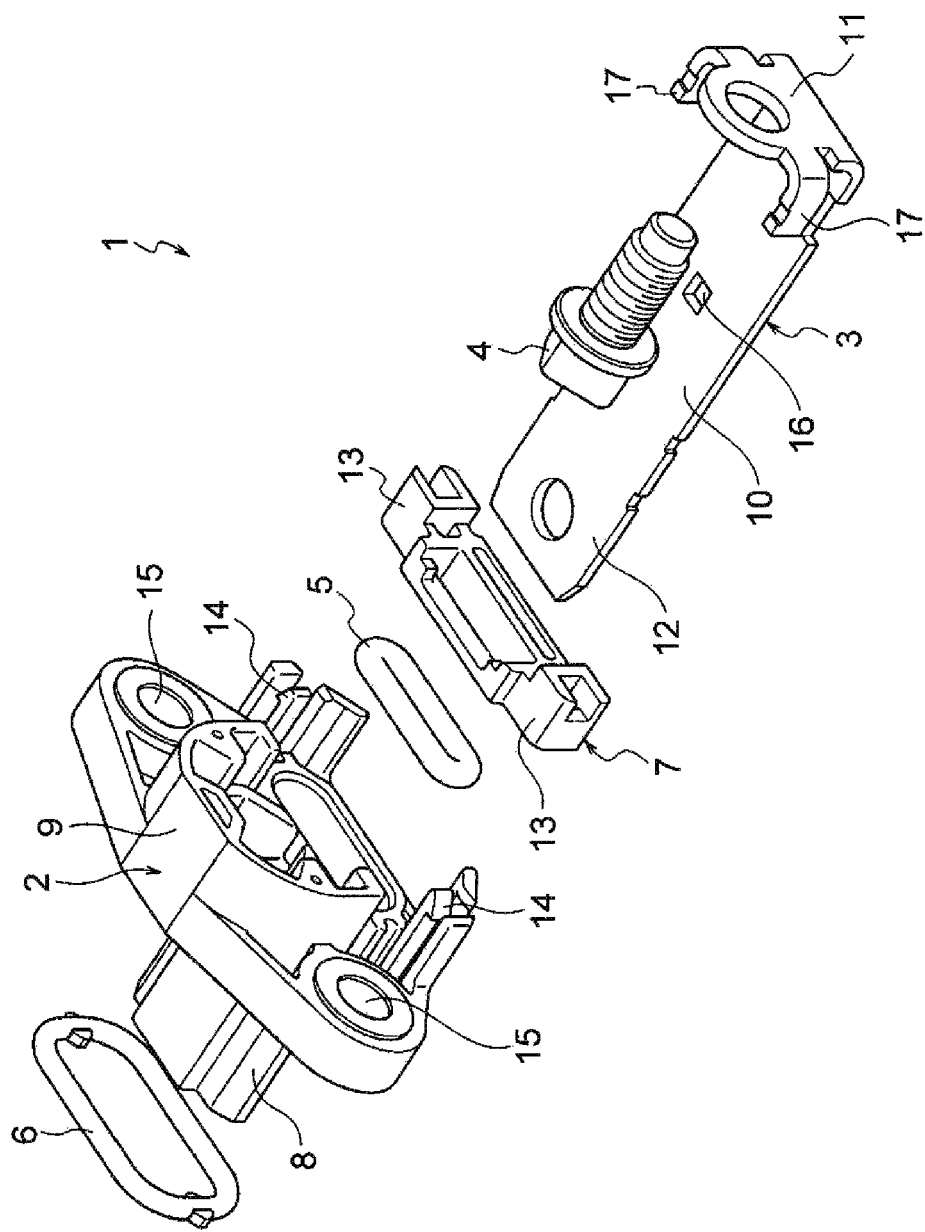
FIG. 9 is an exploded perspective view of the terminal block of the conventional example.
Figure 10:
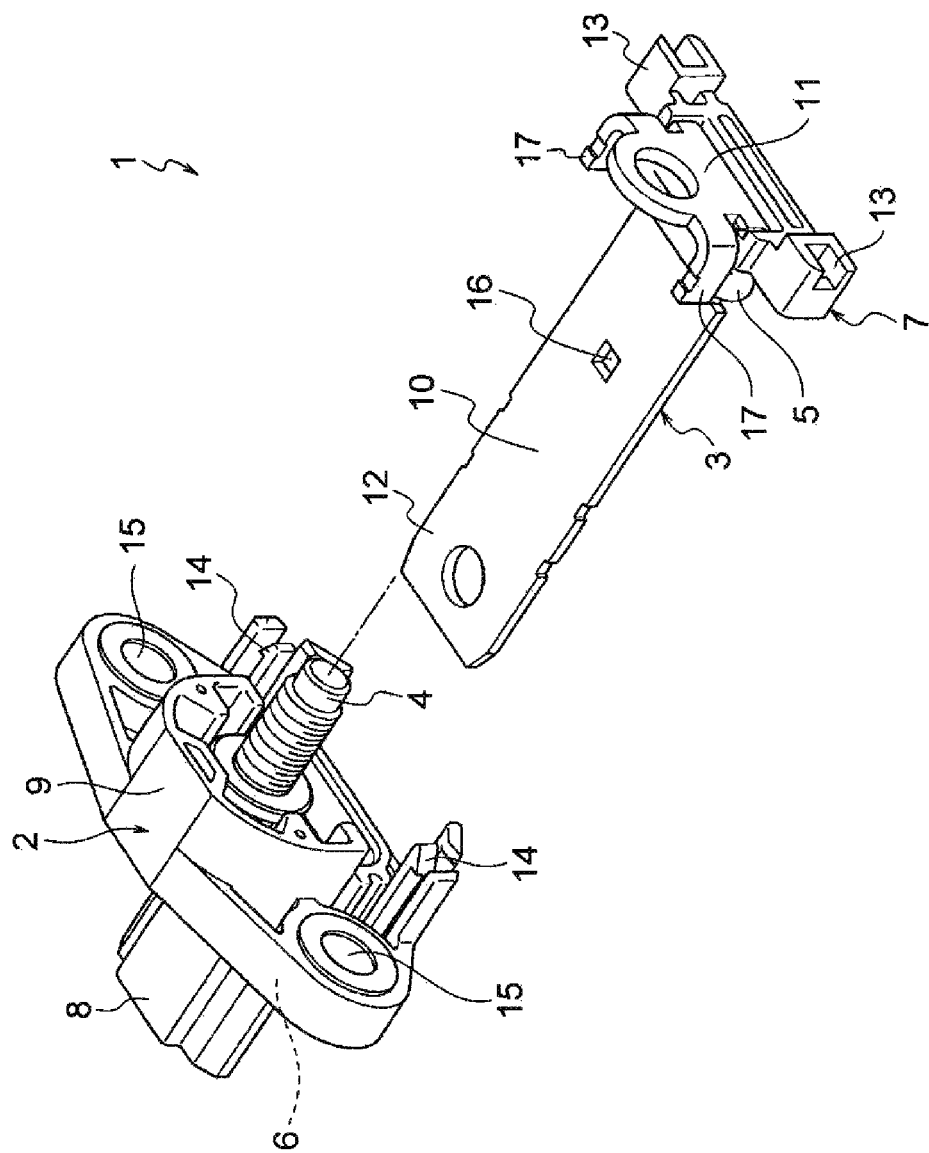
FIG. 10 is a perspective view showing a state where the holder and the O-ring are attached to the bus bar of the conventional example.

Hereinafter, an example will be described with reference to the drawings. FIGS. 1A and 1B are views showing an embodiment of a terminal block adopting a drain structure of the present invention and an on-vehicle device. FIG. 1A is a schematic view showing an assembly position of the terminal block, and FIG. 1B is a perspective view of the terminal block. FIG. 2 is an exploded perspective view of the terminal block. FIG. 3 is a cross-sectional view taken along the line A-A of FIG. 1B. FIG. 4 is an enlarged view of a relevant part of FIG. 3. FIG. 5 is a view of the path and the spatial distance regarding drainage. FIG. 6 is a cross-sectional view taken along the line A-A of FIG. 2. FIGS. 7A and 7B are views of a housing. FIG. 8 is a cross-sectional view taken along the line A-A of FIG. 7A.

Regarding arrows P, Q and R in FIGS. 1A and 1B, in the present example, the arrow P indicates the vertical direction, the arrow Q represents the horizontal direction, and the arrow R represents the front-back direction.

<Regarding the Structure of the Terminal Block 21>

In FIGS. 1A and 1B, reference numeral 21 represents the terminal block. The terminal block 21 is attached to an upper wall W (wall) of a metallic device box B of, for example, a DC-DC converter (on-vehicle device K) mounted on a car. The terminal block 21 includes the drain structure H so that, for example, moisture from above is prevented from remaining accumulated in the housing body 44 described later. The drain structure H is capable of facilitating drainage from the housing body 44 to the outside G (attachment outer portion) and making entrance of moisture from the outside G difficult.

In FIGS. 1A, 1B and 2, the terminal block 21 is used for establishing electrical connection between the inside and outside of the upper wall W, and is provided with a bus bar part 22, a resin-made housing 23 to which this bus bar part 22 is assembled, an O-ring 24 and a stud bolt 25 assembled to the housing 23, and the drain structure H. The terminal block 21 is connected to the non-illustrated device body inside the upper wall W. Moreover, outside the upper wall W, the non-illustrated wire harness is connected. The wire harness is connected to the device body through the terminal block 21.

<Regarding the Structure of the Bus Bar Part 22>

In FIGS. 2 and 6, the bus bar part 22 is provided with a bus bar 26, an O-ring 27 and a holder 28.

<Regarding the Bus Bar 26>

In FIGS. 2 and 6, the bus bar 26 is a member necessary for the electrical connection between the inside and outside of the upper wall W (see FIGS. 1A and 1B), and is formed by stamping a comparatively thick metallic plate having conductivity. The bus bar 26 which has a bus bar body 29, an outside terminal portion 30 and an inside terminal portion 31 is formed in an illustrated shape.

The bus bar body 29 which is a part disposed between the outside terminal portion 30 and the inside terminal portion 31 is formed in a band plate form the obverse and reverse surfaces of which are flat. In the middle of the bus bar body 29 like this, a bus bar side lock portion 32 is formed that passes through the obverse and reverse surfaces in a rectangular shape. The bus bar side lock portion 32 is formed as a lock portion to be engaged with a later-described housing side lock portion 59 (see FIGS. 7A and 7B) of the housing 23.

The outside terminal portion 30 is formed in a part that is bent 90 degrees with respect to the bus bar body 29. In other words, the outside terminal portion 30 is formed so as to extend in a direction orthogonal to the axial direction of the bus bar body 29. Moreover, the outside terminal portion 30 is also formed in a part where electrical connection can be made with terminal metal fittings at the terminal of a non-illustrated wire harness outside the upper wall W. At the outside terminal portion 30 like this, an insertion hole 33 passing therethrough in a circular shape and a pair of engagement pieces 34 are formed.

The insertion hole 33 is formed as a part fitted on a shaft portion 35 of the stud bolt 25. The pair of engagement pieces 34 are formed by bending side portions of the outside terminal portion 30 so that the ends thereof extend toward a later-described bottom wall 53 of the housing 23. The pair of engagement pieces 34 are formed as parts where a pair of later-described terminal engagement portions 38 of the holder 28 are fitted (when looked from a different angle, they are formed as parts held by the pair of pair of terminal engagement portions 38).

The inside terminal portion 31 is formed as a part continuous with the other end side of the bus bar body 29. Moreover, the inside terminal portion 31 is also formed as a part electrically connected to device side terminal fittings of the non-illustrated device body inside the upper wall W. In the present example, the inside terminal portion 31 is formed in the illustrated shape having a U-shaped cutout 36.

<Regarding the O-Ring 27>

In FIGS. 2 and 6, the O-ring 27 is a member made of rubber or elastomer, and has elasticity. The O-ring 27 is provided for waterproofing between the bus bar 26 and the housing 23. The O-ring 27 is formed in an annular shape (ring shape) that is substantially elliptical in plan view. Moreover, the O-ring 27 is also formed in a shape circular in cross section.

<Regarding the Holder 28>

In FIGS. 2 and 6, the holder 28 is assembled to the bus bar 26 so as to be a component of the bus bar part 22. The holder 28 is formed in a shape accommodated in a later-described holder accommodating portion 50 of the housing 23. The holder 28 is a resin-made member for straightly pressing the O-ring 27 to a predetermined position of the housing 23 to hold it, and is formed in the illustrated shape having a holder body 37 and the pair of terminal engagement portions 38.

The holder body 37 is formed at a part where the assembly to the bus bar body 29 is insertion. The holder body 37 is formed so that the outer peripheral surface thereof becomes a guided surface 39 for the later-described holder accommodating portion 50.

The terminal engagement portions 38 are formed at parts continuous with right and left ends of the holder body 37, respectively. At the terminal engagement portions 38 like this, insertion accommodating portions 40 are formed. The insertion accommodating portions 40 are formed at parts where the engagement pieces 34 of the outside terminal portion 30 on the bus bar 26 engage. The insertion accommodating portions 40 are also formed as space extension portions 41 in addition to the parts where the engagement pieces 34 engage.

The space extension portions 41 are formed at parts that keep the engagement pieces 34 away from later-described drain outlets 43 by a spatial distance. The space extension portions 41 are formed of the bottom parts and peripheral wall parts of the insertion accommodating portions 40. Reference numeral 42 at the insertion accommodating portion 40 (the space extension portion 41) represents a notched portion. This notched portion 42 is disposed and formed in a position away from the drain outlet 43 (described later) as shown in FIGS. 4 and 5.

<Regarding the Housing 23>

In FIGS. 2, 7A, 7B and 8, the housing 23 which is a member constituting the terminal block 21 together with the bus bar part 22 is formed in the illustrated shape having the housing body 44 having the drain outlets 43, a wall insertion portion 45, a pair of body fixing portions 46, a pair of collars 47 and drain ditch formation portions 48. The housing 23 is such that when it is attached to the upper wall W, the housing body 44 is disposed outside the upper wall W. Moreover, the housing 23 is such that when it is attached to the upper wall W, the wall insertion portion 45 passes through the upper wall W so that the end side of the wall insertion portion 45 is disposed inside the upper wall W. For the fixing of the housing 23 to the upper wall W, bolts 49 (see FIG. 1A) are used. In the housing 23, only the pair of collars 47 are made of a metal and the remainder is made of resin.

Of the above-described parts and members of the housing 23, the drain outlets 43 and the drain ditch formation portions 48 constitute the later-described drain structure H.

<Regarding the Housing Body 44>

In FIGS. 2, 7A, 7B and 8, the housing body 44 has the holder accommodating portion 50 for the bus bar part 22 and a bolt accommodating portion 52 accommodating and holding the head 51 of the stud bolt 25. The holder accommodating portion 50 is formed as a part surrounded by the bottom wall 53 of the housing body 44 and a rectangular-frame-form peripheral wall 54. On the inner surface of the peripheral wall 54, a holder guide portion 55 for guiding the holder 28 of the bus bar part 22 is formed. The bolt accommodating portion 52 is disposed and formed inside the holder accommodating portion 50. Reference numeral 56 at the bolt accommodating portion 52 represents a terminal support portion. This terminal support portion 56 is formed as a receiving portion for the outside terminal portion 30 of the bus bar part 22.

<Regarding the Pair of Drain Outlets 43>

In FIGS. 7A, 7B and 8, the pair of drain outlets 43 are formed at parts passing through the bottom wall 53 of the housing body 44. The pair of drain outlets 43 like this are disposed and formed at two angular parts of the peripheral wall 54 of the housing body 44, respectively. Moreover, the pair of drain outlets 43 are disposed and formed in the neighborhood of the base end positions of the pair of body fixing portions 46, respectively. Between the pair of drain outlets 43, the bolt accommodating portion 52 is disposed and formed. The pair of drain outlets 43 are formed at parts continuous with the later-described drain ditch formation portions 48.

<Regarding the Wall Insertion Portion 45>

In FIGS. 2, 7A, 7B and 8, the wall insertion portion 45 is formed as a part integrated with the housing body 44. Moreover, the wall insertion portion 45 is formed as a part straightly extending from the lower surface of the housing body 44 (an outer surface 57 of the bottom wall 53 of the housing body 44). The wall insertion portion 45 is formed as a part inserted in an insertion hole WH (see FIG. 3) of the upper wall W. The wall insertion portion 45 like this has a bus bar insertion hole 58 and the housing side lock portion 59.

The bus bar insertion hole 58 is formed as a part inserted in the bus bar body 29 of the bus bar 26. In the bus bar insertion hole 58, the housing side lock portion 59 is disposed and formed. The housing side lock portion 59 is formed as a part locking the bus bar side lock portion 32 of the bus bar body 29. At one end of the bus bar insertion hole 58, an O-ring accommodating portion 60 is formed. The O-ring accommodating portion 60 is a part for accommodating the O-ring 27 of the bus bar part 22, and is formed in a space larger than the bus bar insertion hole 58. The O-ring accommodating portion 60 and the bus bar insertion hole 58 are opened so that they can be seen from the side of the holder accommodating portion 50 of the housing body 44.

<Regarding an O-Ring Accommodating Portion 61, Etc.>

In FIGS. 2, 7A and 7B, on the outer surface 57 of the bottom wall 53 of the housing body 44 outside the wall insertion portion 45, an O-ring accommodating portion 61 is formed so as to surround the wall insertion portion 45. Unlike the above-described O-ring accommodating portion 60, this O-ring accommodating portion 61 is a part disposed outside the wall insertion portion 45, and is formed as a part accommodating an O-ring body 62 of the O-ring 24 for sealing between the bottom wall 53 and the upper wall W. The O-ring accommodating portion 61 is formed in an annular and shallow groove shape as shown in FIG. 7B. Reference numeral 63 represents a housing side lock portion for locking a pair of lock portions 64 ganged with the O-ring body 62. The housing side lock portion 63 is disposed and formed outside the O-ring accommodating portion 61.

<Regarding a Pair of Body Fixing Portions 46 and the Collars 47>

In FIGS. 2, 7A and 7B, the pair of body fixing portions 46 are fixing portions for attaching the housing 23 to the upper wall W, and are ganged with side portions of the housing body 44. On the pair of body fixing portions 46, bolt fixing holes 65 where the bolts 49 are inserted are formed. To the bolt fixing holes 65, the cylindrical collars 47 are attached, respectively. The collars 47 are formed in a size slightly protruding from the opening edges of the bolt fixing holes 65 (see the inside of the circle of FIG. 8).

<Regarding the Structure of the Drain Structure H>

In FIGS. 3 to 5, the drain structure H is a structure related to the drainage between the upper wall W and the terminal block 21 (in other words, a structure related to the drainage from the terminal block 21 to the upper wall W), and is provided with the upper wall W, the housing body 44 attached to the side of an outer surface 66 of the upper wall W, the pair of drain outlets 43 passing through the bottom wall 53 of the housing body 44, and the drain ditch formation portions 48 for forming drain ditches HR from the pair of drain outlets 43 to the outside G (attachment outer portion) of the housing body 44.

The drain structure H is such that, since the components other than the upper wall W are components on the side of the housing 23, the drain structure H is provided on the terminal block 21. In addition, in the drain structure H, the upper wall W is not limited to the horizontal wall as in FIGS. 1A and 1B but may be inclined.

<Regarding the Drain Ditch Formation Portions 48>

In FIGS. 3 to 5, the drain ditch formation portions 48 are portions for forming the drain ditches HR from the drain outlets 43 to the outside G (attachment outer portion) as described above, and the outer surface 57 of the bottom wall 53 is formed so as to be separated from the outer surface 66 of the upper wall W by the dimension of a gap ΔS where a capillary phenomenon occurs. The drain ditch formation portions 48 are formed over the entire peripheries of the opening edges of the drain outlets 43.

For the drain ditch formation portions 48, it is preferable that the drain ditches HR be radially formed from the drain outlets 43 to the outside G. That is, it is preferable that the drain ditches HR be formed in any direction with respect to the outer surface 66 of the upper wall W. The formation like this has an advantage in that, supposing that moisture moves toward the drain outlets 43, the moisture easily passes through the drain outlets 43. For this reason, it also has an advantage in that entrance of moisture from the drain outlets 43 into the housing body 44 becomes difficult to occur.

Regarding the drain ditch formation portions 48, as described above, the outer surface 57 of the bottom wall 53 is formed so as to be separated from the outer surface 66 of the upper wall W by the dimension of the gap ΔS where a capillary phenomenon occurs. For this reason, the gap ΔS is extremely small, so that even if moisture is likely to enter the gap ΔS from the outside G (attachment outer portion) of the housing body 44, it is needless to say that the entrance is difficult. Even if moisture enters, the moisture passes through the drain outlets 43 as described above, so that the entrance of the moisture from the drain outlets 43 into the housing body 44 is difficult to occur.

The drain ditch formation portions 48 are formed by causing the gap ΔS by elastic deformation in the deformation direction of the O-ring 24, or (and/or) are formed by causing the gap ΔS by causing the collars 47 to protrude toward the outer surface 57 of the bottom wall 53. In the present example, the drain ditch formation portions 48 are formed by causing gaps ΔS of approximately 0.2 mm in the vertical direction at both the O-ring 24 and the collars 47.

It is assumed that the gap ΔS of the drain ditch formation portions 48 is not a merely backlash in assembly between the upper wall W and the terminal block 21. The gap ΔS is positively formed as the drain ditch formation portions 48.

<Regarding Drainage by the Drain Structure H>

In FIGS. 3 to 5, for example, when moisture falls on the terminal block 1 from above at the time of high-pressure washing, the moisture heads for an inner surface 67 of the bottom wall 53 of the housing body 44. Then, on the inner surface 67 of the bottom wall 53, the moisture heads for the drain outlets 43 without accumulating. The moisture having fallen into the drain outlets 43 is drained to the outside G at the drain ditches HR formed at the drain ditch formation portions 48 or by a pulling force by the capillary phenomenon.

<Regarding Leak Prevention>

In FIGS. 3 to 5, the distance of the ends of the engagement pieces 34 of the bus bar 26 at the bus bar part 22 to the metallic upper wall W seen from the drain outlets 43 is in a state of being short linearly. If nothing is disposed between the ends of the engagement pieces 34 and the upper wall W and moisture is present therebetween, it is apprehended that a leak occurs at the terminal block 21 where electrical connection is made. However, since the space extension portion 41 is formed in the holder 28 and this is externally present between the ends of the engagement pieces 34 and the upper wall W, the spatial distance non-linearly extends as shown by the thick arrow T in FIG. 5 (becomes a labyrinth form), so that an appropriate spatial distance can be maintained and this can prevent leak.

<Regarding the Advantages of the Drain Structure H, the Terminal Block 21 and the On-Vehicle Device K>

As described above with reference to FIGS. 1A to 8, according to the drain structure H as an embodiment of the present invention, moisture can be drained to the outside G from the drain outlets 43 of the housing body 44 through the drain ditches HR of the drain ditch formation portions 48. Moreover, entrance of moisture from the outside G (the attachment outer portion of the housing body 44) can be made difficult since the gap ΔS of the drain ditch formation portions 48 is small, so that even if moisture enters from the gap ΔS, it can be made difficult for the moisture to enter the inside of the housing body 44 from the drain outlets 43 and accumulate inside the housing body 44. Therefore, according to the drain structure H, an advantage is produced in that drainage to the outside G can be facilitated and entrance of moisture from the outside G can be made difficult.

Moreover, according to the drain structure H, by using the elastic deformation of the O-ring 24 (in the case of the present example, by also using the metallic collars 47), the outer surface 57 of the bottom wall 53 can be easily separated from the outer surface 66 of the upper wall W by the dimension of the gap ΔS where a capillary phenomenon occurs. Consequently, an advantage is produced in that drainage to the outside G can be facilitated and entrance of moisture from the outside G can be made difficult without the adoption of a complicated structure.

Moreover, according to the drain structure H, even if moisture from the outside G enters from the gap ΔS of the drain ditch formation portions 48, since the gap ΔS is present over the entire peripheries of the opening edges of the drain outlets 43, the moisture from the outside G can be made easy to pass. Consequently, an advantage is produced in that entrance of moisture into the housing body 44 can be made difficult.

In addition, since the drain structure H as described above is adopted, an advantage is produced in that more excellent terminal block 21 and on-vehicle device K can be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drain structure comprising:
a wall;
a housing body attached to an outer surface side of the wall;
a drain outlet passing through a bottom wall of the housing body;
a drain ditch formation portion for forming a drain ditch from the drain outlet to an attachment outer portion of the housing body, and
an O-ring sandwiched between the wall and the bottom wall,
wherein in the drain ditch formation portion, an outer surface of the bottom wall is formed so as to be separated from the outer surface side of the wall by a dimension of a gap where a capillary phenomenon occurs,
wherein the drain ditch formation portion is formed from the gap caused by elastic deformation in a deformation direction of the O-ring, and
wherein the drain ditch formation portion is formed in a position outside the O-ring and over an entire periphery of an opening edge of the drain outlet.

2. The drain structure according to claim 1, further comprising a metallic collar provided on a body fixing portion continuous with the housing body, and a bolt inserted in the collar,
wherein the drain ditch formation portion is formed by causing the collar to protrude toward the outer surface of the bottom wall to cause the gap.

3. The drain structure according to claim 2,
wherein the drain ditch formation portion is formed in a neighborhood of a base end position of the body fixing portion and over an entire periphery of an opening edge of the drain outlet.

4. The drain structure according to claim 1,
wherein the wall is formed as an upper wall of a device box accommodating a device body.

5. A terminal block comprising:
a housing body attached to an outer surface side of a wall;
a drain outlet passing through a bottom wall of the housing body;
a drain ditch formation portion for forming a drain ditch from the drain outlet to an attachment outer portion of the housing body, and
an O-ring sandwiched between the wall and the bottom wall,
wherein in the drain ditch formation portion, an outer surface of the bottom wall is formed so as to be separated from the outer surface the wall by a dimension of a gap where a capillary phenomenon occurs,
wherein the drain ditch formation portion is formed from the gap caused by elastic deformation in a deformation direction of the O-ring, and
wherein the drain ditch formation portion is formed in a position outside the O-ring and over an entire periphery of an opening edge of the drain outlet.

6. The terminal block according to claim 5, further comprising a bus bar for electrically connecting an inside and an outside of the wall, and a holder for accommodating the bus bar in the housing body,
wherein a space extension portion for extending a spatial distance from the bus bar to the drain outlet is formed on the holder.

7. The terminal block according to claim 5,
wherein the wall is formed as an upper wall of a device box accommodating a device body.

8. An on-vehicle device mounted on a vehicle comprising:
a device body;
a device box accommodating the device body;
the terminal block according to claim 5 attached to an upper all of the device box; and
a wire harness electrically connected to the device body through the terminal block.

* * * * *